United States Patent
Neckermann et al.

(10) Patent No.: US 11,288,034 B2
(45) Date of Patent: Mar. 29, 2022

(54) HIERARCHICAL TOPIC EXTRACTION AND VISUALIZATION FOR AUDIO STREAMS

(71) Applicant: Microsoft Technology Licensing, LLC, Redmond, WA (US)

(72) Inventors: Tom Neckermann, Seattle, WA (US); Romain Gabriel Paul Rey, Vancouver (CA); Alexander James Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/849,052

(22) Filed: Apr. 15, 2020

(65) Prior Publication Data

US 2021/0326098 A1  Oct. 21, 2021

(51) Int. Cl.
*G06F 3/16* (2006.01)
*G06F 3/0485* (2013.01)
*G06F 3/0482* (2013.01)
*G10L 15/26* (2006.01)
*G06F 3/04855* (2022.01)

(52) U.S. Cl.
CPC .......... *G06F 3/165* (2013.01); *G06F 3/0482* (2013.01); *G06F 3/04855* (2013.01); *G10L 15/26* (2013.01)

(58) Field of Classification Search
CPC .... G06F 3/165; G06F 3/0482; G06F 3/04855; G10L 15/26
See application file for complete search history.

(56) References Cited

U.S. PATENT DOCUMENTS

| | | | |
|---|---|---|---|
| 7,698,652 B2 * | 4/2010 | Sagar | G06F 3/04842 715/787 |
| 8,060,494 B2 | 11/2011 | Seide et al. | |
| 2007/0013609 A1 * | 1/2007 | Crow | G11B 27/326 345/1.1 |
| 2008/0300872 A1 | 12/2008 | Basu et al. | |
| 2010/0231536 A1 * | 9/2010 | Chaudhri | G06F 3/0488 345/173 |
| 2012/0030625 A1 * | 2/2012 | Miyazaki | G06F 3/0485 715/830 |

(Continued)

FOREIGN PATENT DOCUMENTS

EP  1538536 A1  6/2005

OTHER PUBLICATIONS

"International Search Report and the Written Opinion Issued in PCT Application No. PCT/US2021/018433", dated May 19, 2021, 10 Pages.

*Primary Examiner* — Jennifer N Welch
*Assistant Examiner* — Parmanand D Patel
(74) *Attorney, Agent, or Firm* — Christopher J. Volkmann; Kelly, Holt & Christenson, PLLC

(57) ABSTRACT

An audio stream is subjected to speech-to-text processing in order to obtain a textual representation of the audio stream. Hierarchical topic extraction is performed on the textual representation to obtain a multi-level hierarchical topic representation of the textual representation. A user interface actuator is generated, which allows a user to search through the audio stream. Different levels of the multi-level hierarchical topic representation are displayed to the user, based upon the speed of actuation of the user interface actuator.

15 Claims, 11 Drawing Sheets

(56) References Cited

U.S. PATENT DOCUMENTS

| | | | |
|---|---|---|---|
| 2014/0219433 A1* | 8/2014 | Pai | H04M 3/565 379/202.01 |
| 2014/0334799 A1* | 11/2014 | Dhawan | G11B 27/10 386/244 |
| 2017/0025096 A1 | 1/2017 | Fan et al. | |
| 2017/0085854 A1* | 3/2017 | Furesjo | H04N 7/152 |

\* cited by examiner

HIERARCHICAL TOPIC EXTRACTION AND VISUALIZATION FOR AUDIO STREAMS

BACKGROUND

There are a wide variety of different types of computing systems. Some computing systems implement platforms for streaming audio and/or video content. Other platforms also make audio and/or video content available for streaming in other ways. For instance, meeting platforms that provide audio or video conferencing often provide functionality for recording the conferences and make the recorded audio and/or video data available for streaming. Examples of such audio streams include things such as podcasts, recorded audio conferences, recorded meetings, among other things.

Audio streams (whether they originate as audio streams or are taken from a video stream) are inherently serial and unidirectional, in that they are consumed by starting any point in the stream and proceeding in a forward direction. It is not uncommon for users who stream the audio content to listen to part of the audio content, stop the streaming audio and close the streaming application, and then come back later and listen to the remainder of the audio content. This often means that the user must attempt to find the location in the audio stream, where the user previously stopped listening.

The discussion above is merely provided for general background information and is not intended to be used as an aid in determining the scope of the claimed subject matter.

SUMMARY

An audio stream is subjected to speech-to-text processing in order to obtain a textual representation of the audio stream. Hierarchical topic extraction is performed on the textual representation to obtain a multi-level hierarchical topic representation of the textual representation. A user interface actuator is generated, which allows a user to search through the audio stream. Different levels of the multi-level hierarchical topic representation are displayed to the user, based upon the speed of actuation of the user interface actuator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for a user (or consumer) of an audio stream to listen to part of the audio content being streamed, to stop, close the streaming application, and then return to the audio stream later in order to finish listening to the audio stream. Because of the serial and unidirectional nature of audio streams, navigating in an audio stream can be tedious and inefficient.

For example, assume that a user was listening to a long podcast but was interrupted and so closed the audio streaming application. Now, assume that the same user wants to continue from where he or she previously stopped. Currently, the user must estimate the right time point, use a scroll bar to scroll to roughly that time point, listen to a section of the audio stream, figure out the context of that section, and adjust the time point forwards or backwards on an audio stream playing system, based on this context, then listen to another section of the audio, figure out the context again, and so on, until the user finds the right spot in the audio stream to again begin listening. This type of problem applies to all types of audio streams, including meeting recordings, podcasts, video tutorials that are heavily audio-based, among others.

The present discussion thus proceeds with respect to enabling much easier navigation. In one example, a textual representation is generated for the audio stream, by using speech-to-text processing. A hierarchical topic representation is generated from the textual representation, with the different "levels" of the hierarchical representation having a different level of detail. A user interface actuator, such as a scroll mechanism, is linked to the hierarchical topic representation, and the speed at which the user is scrolling through the audio stream determines which level of the hierarchical topic representation is shown to the user. Thus, as the user scrolls more quickly, a higher level in the hierarchical representation (having more general topic areas) is displayed. When the user scrolls more slowly, a lower level in the hierarchical representation (having more detailed topic areas), is displayed to the user. This allows the user to quickly find the general area in the audio stream where he or she stopped listening by seeing more general topics in the audio stream, and then to slow down scrolling to see a more detailed representation of the audio stream (up to and including the actual transcription of the audio stream) to find the precise location where the user wishes to begin listening.

Figure 1:
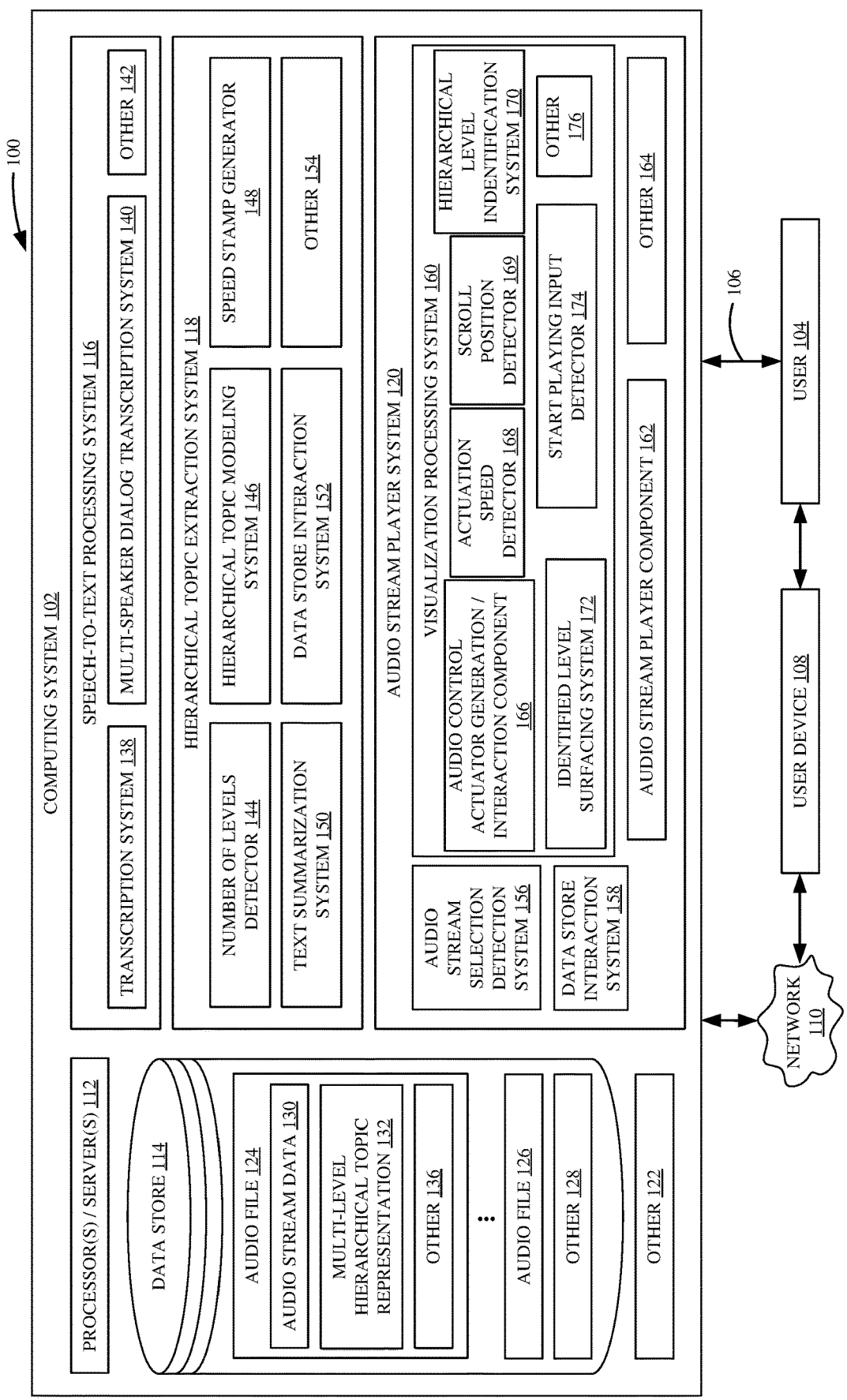
FIG. 1 is a block diagram of one example of a computing system architecture.

FIG. 1 is a block diagram showing one example of a computing system architecture 100, in which a computing system 102 can be accessed by a user 104 either directly, as indicated by arrow 106, or by using a user device 108 (such as a mobile device, a laptop computer, a desktop computer, etc.) over a network 110. Thus, network 110 can be any of a wide variety of different types of networks, such as a local area network, a wide area network, a cellular communication network, a near field communication network, or any of a wide variety of other networks or combinations of networks.

Computing system 102 illustratively includes one or more processors or servers 112, data store 114, speech-to-text processing system 116, hierarchical topic extraction system 118, audio stream player system 120, and it can include other items 122.

Data store 114 illustratively includes a plurality of different audio files 124-126. It can include other items 128 as well. Each audio file 124-126 illustratively includes audio stream data (or an audio stream) 130. Each audio file 124 can also include a multi-level hierarchical topic representation 132 corresponding to the audio stream data 130. As is described in greater detail below, the multi-level hierarchical topic representation 132 can be generated by hierarchical topic extraction system 118. Each audio file 124 can include a wide variety of other items 136 as well.

Speech-to-text processing system 116 illustratively includes transcription system 138, and it can include multi-speaker dialog transcription system 140 as well as other items 142. Transcription system 138 can be any of a wide variety of different types of speech recognition systems that transcribe a speech input into a textual output. System 138 thus outputs words and/or sentences independently. System 116 can also include multi-speaker dialog transcription system 140 which enables dialog transcription from multiple different speakers. System 140 thus identifies which speakers are speaking, and attributes transcribed audio to those speakers. Systems 138 and 140 can be used in conjunction with one another, or separately. In addition, speech-to-text processing system 116 can use just a single system 138 or 140 as well.

Hierarchical topic extraction system 118 generates a multi-level hierarchical topic representation of the transcribed text. System 118 thus includes a number of levels detector 144, a hierarchical topic modeling system 146, speed stamp generator 148, text summarization system 150, data store interaction system 152, and it can include other items 154. The hierarchical topic extraction system may be configurable in terms of the number of different levels in the hierarchical representation, that are generated for an audio stream, or for different sets of audio streams having different parameters. For instance, it may be that a greater number of levels are generated in the hierarchical structure for longer audio streams. This is just one example. Similarly, the number of levels may be user configurable. By way of example, it may be that a user wishes to have a high degree of specificity for searching or scrolling through a certain audio stream, but may only wish to use a relatively abstract representation when searching through another audio stream. The number of levels detector 144 thus detects the number of levels based upon the criteria being used. For example, if the number of levels is based upon the length of the audio stream being processed, then number of levels detector 144 can identify the length of the audio stream and set the number of levels accordingly. If the number of levels is determined based upon a user input or a user preference, then number of levels detector 144 is provided with an indication of the user input or accesses the user preferences. Again, these are only examples and the number of levels in the hierarchical topic representation can be determined in other ways as well.

The number of levels is provided to hierarchical topic modeling system 146 which applies any of a wide variety of different types of topic extraction systems to the textual representation of the audio stream. System 146 then generates a multi-level hierarchical representation (a tree) of topics at different levels of granularity, and for different parts of the audio stream. One example of such a system is a Hierarchical Latent Dirichlet Allocation (hLDA), but this is just one of many different types of hierarchical topic modeling systems that can be used.

An example may be helpful. Assume that a sentence in an audio stream is "ACME reports that there have been many problems such as slowdowns in the distribution channels between the US and China Trade Commissions." This, the actual text of the audio stream, may be the lowest level (or the level of the highest granularity in topic extraction) in the multi-level hierarchical topic representation. A next level above the most granular level may be a first intermediate level may be generated by extracting keywords from the sentence. For example, the keywords maybe "US", "China", "trade", and "problems". The first intermediate level may also be generated using a key sentence extraction system which may pick the most relevant chains of words from the sentence. Yet another intermediate level may use a neural network-based text summarizer that generates a more concise sentence from the original full sentence. A higher-level topic representation may include a summary phrase such as "Problems with US-China distribution channels". A top level for this sentence, in the hierarchical topic representation may be a relatively general topic that spans the entire text, such as "US-China trade".

In one example, the hierarchical topic modeling system 146 that is used is a top-to-bottom modeling system in that it generates the most broad topic at the top of the hierarchical representation, and the topics having the most detailed granularity at the lower end of the hierarchical structure. Similarly, it enforces a constraint to preferentially use words from the actual textual representation in the topic extractions. By way of example, instead of generating a sentence summary using words that were not found in the original textual representation, the system is constrained to prefer words that were actually used in the textual representation. This will enable the user to more quickly recognize where he or she wishes to begin listening. Thus, if not included in hierarchical topic modeling system 146, text summarization system 150 can provide summaries of various textual portions as well.

As is described in greater detail below, in one example a scroll actuator is surfaced for user actuation. The scroll actuator is described in greater detail below with respect to FIG. 2. Briefly, it may be an actuator that allows the user to move his or her finger along a scrollbar to scroll through the audio stream. Also, in an example described below, the level of topics displayed to the user during the scroll operation (and obtained from the multi-level hierarchical topic representation) is determined based upon the speed with which the user is scrolling through the audio stream. If the user is scrolling relatively quickly, that may mean that the user is attempting to find the general location where he or she stopped the audio stream. If the user is scrolling more slowly, that may indicate that he or she is attempting to find a more precise location where he or she stopped the audio stream. Thus, in one example, speed stamp generator 148 generates a speed stamp which indicates the scrolling speed at which a particular level in the multi-level hierarchical representation is to be surfaced for the user. The speed stamp may indicate the speed of actuation of a number of different actuators, such as a scrollbar, or other scrolling actuators. The speed stamp may indicate a speed range where, if the user is scrolling the scrollbar at a speed which is within the speed range, then the level in the multi-level hierarchical representation, that has the speed stamp that includes the actuation speed, is surfaced for the user.

Each level in the multi-level hierarchical representation is thus associated with a different speed stamp. Each speed stamp may indicate a range of scrolling speeds (or other actuator speeds). During runtime, the user illustratively scrolls the actuator at a scroll speed. The scroll speed is detected and compared against the speed stamps for each level in the multi-level hierarchical structure, to identify a particular level where the speed stamp matches the scroll speed of the user. The topic information from the corresponding level is surfaced for the user, above or adjacent the scrollbar. The particular speed stamps that are generated by speed stamp generator 148 may vary depending upon the number of levels in the multi-level hierarchical structure, depending on the length of the audio stream, depending on user preference, or depending on any of a wide variety of other criteria. Suffice it to say, for now, that speed stamp generator 148 generates a speed stamp corresponding to each level in the multi-level hierarchical structure.

Once the multi-level hierarchical topic representation is generated, and the speed stamps for the different levels are generated, then data store interaction system 152 stores the multi-level hierarchical topic representation, along with the audio stream data.

Audio stream player system 120 illustratively includes audio stream selection detector 156, data store interaction system 158, visualization processing system 160, audio stream playing component 162, and it can include other items 164. Visualization processing system 160 illustratively includes audio control actuator generation/interaction component 166, actuation speed detector 168, scroll position detector 169, hierarchical level identification system 170, identified level surfacing system 172, start playing input detector 174, and it can include other items 176. Audio stream selection detector 156 illustratively detects a user input selecting a particular audio file 124-126 to be played. Data store interaction system 158 illustratively accesses the audio file (for the present example assume that audio file 124 is selected). The audio stream data 130 and the corresponding multi-level hierarchical topic representation 132 are obtained. Visual processing system 160 then generates an actuator which allows user 104 to scroll through the audio stream to select a place to begin playing. Thus, audio control actuator generation/interaction component 166 generates a user interface representation of the actuator and detects user interaction with the actuator. One example of an actuator is illustrated in FIG. 2.

Figure 2:
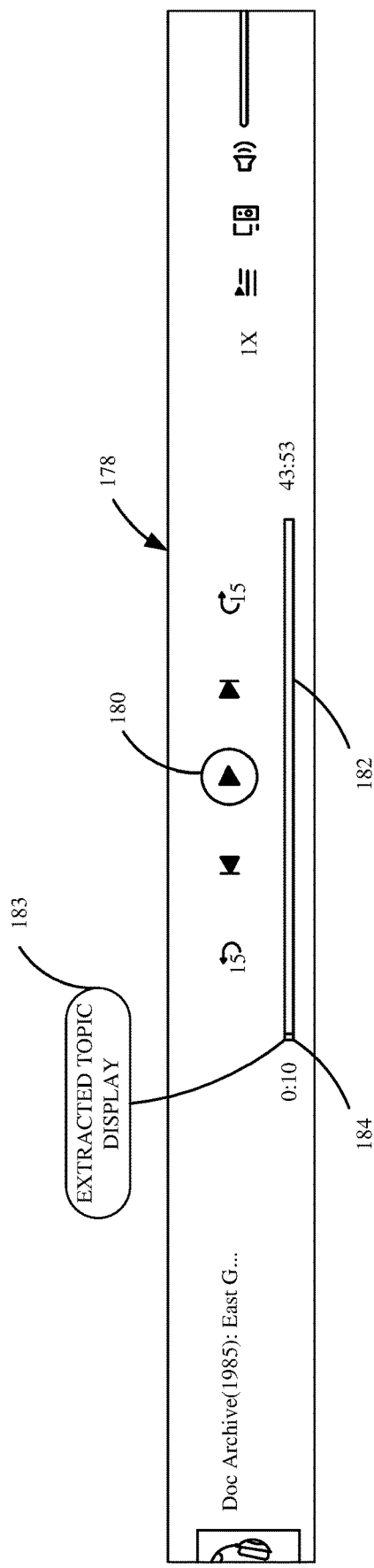
FIG. 2 is a pictorial illustration of one example of a user interface actuator that allows a user to scroll through audio content in an audio stream.

FIG. 2 shows an actuator which comprises a control bar 178 with a plurality of different controls. The controls include a start/stop actuator 180, and a scroll actuator 182. The scroll actuator 182 is provided in the form of a scrollbar which allows the user to either click and drag a thumb 184 along the scrollbar, or touch and drag thumb 184 along the scrollbar to a position representing a time within the audio stream.

As discussed above, it can be difficult for user 104 to identify the proper place within the audio stream to begin listening, by using scroll bar 182. Thus, visualization processing system 160 also displays topic texts, at different granularities of specificity, from the multi-level hierarchical topic representation of the audio stream. It can, for example, display an extracted topic display 183 with the extracted topics displayed therein. Actuation speed detector 168 detects a speed with which user 104 is actuating the scrollbar (e.g., the scroll speed that indicates how quickly the user is dragging the thumb 184 along the scrollbar 182). Hierarchical level identification system 170 then compares that scroll speed against the speed stamps on the different levels in the multi-level hierarchical representation to identify a level that has a speed stamp that corresponds to the detected scroll speed. Identified level surfacing system 172 surfaces the textual topics, in that level, for the user. When the user reaches the proper place in the audio stream, the user 104 illustratively actuates the start actuator 180. This is detected by start playing input detector 174. In response, audio stream playing component 162 begins playing the audio stream, at that point. Before continuing with the description, an example of a multi-level hierarchical topic representation, of a textual representation that has been generated for an audio stream, may be helpful.

Figure 3:
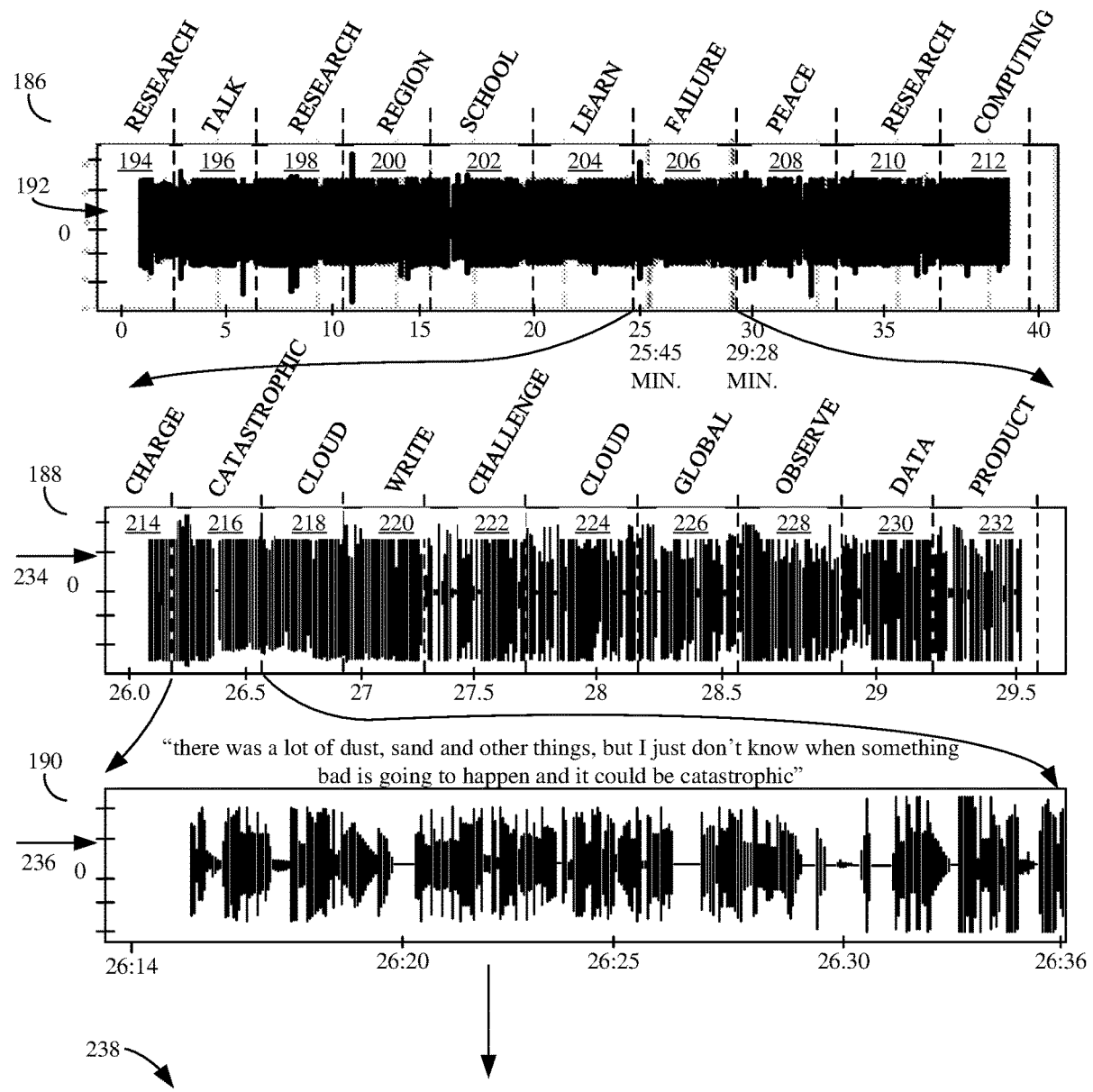
FIG. 3 illustrates how a multi-level hierarchical topic representation corresponds to a textual representation.

FIG. 3 shows an example of multiple different levels 186, 188 and 190 that may be generated in a multi-level hierarchical topic representation of an audio stream.

FIG. 3 also shows, in one example, the audio frequency data that is streamed during a podcast. The audio data for the entire podcast is represented at 192 in FIG. 3. The audio data is plotted with frequency represented by the y-axis and time (in minutes) represented on the x-axis. The podcast is divided into topic extraction windows 194, 196, 198, 200, 202, 204, 206, 208, 210, and 212. FIG. 3 shows an example in which the hierarchical topic modeling system 146 has identified a word, that represents a topic, corresponding to each topic extraction window.

FIG. 3 also shows that, for the topic extraction window 206, a second level 188, of more detail, can be generated. The topic extraction window 206 extends from a time 25:45-29:28 in the podcast represented by the audio data 192. Thus, it can be seen that the second level 188 extracts topics within that time period, of higher detail or greater granularity, than the higher level 186. The hierarchical topic modeling system 146 has thus extracted a topic, represented by a word in level 188, for each of the topic extraction windows 214, 216, 218, 220, 222, 224, 226, 228, 230 and 232. FIG. 3 also shows the audio data 234, in more detail, for the time period extending from 25:45-29:38 of the podcast.

In the example shown in FIG. 3, the third level 190 in the hierarchical structure generated by hierarchical topic modeling system 146 is a summary sentence that represents the actual text, from the podcast, in the extraction window 216 for which a topic was extracted in the form of the word "catastrophic".

Level 190 shows a sentence summary that was generated by text summarization system 150. The sentence summary in level 190 summarizes text that appears in the extraction window 216 of level 188. The audio data that represents the audio stream in extraction window 216 is illustrated by number 236. In another example, the text for level 190 may be generated using key sentence extraction which extracts a key sentence from the text in extraction window 216.

It can thus be seen that, in one example, the higher level 186 and medium level 188 in the hierarchical structure have the terms or topics for each topic extraction window generated using keyword extraction on the fraction of the podcast represented by the corresponding topic extraction window. Level 186 has the topic extraction performed for topic extraction windows that cover the entire podcast. Level 188 has the topic extraction performed for topic extraction windows located within window 206 in the higher level 186. Level 190 summarizes or quotes the text from the audio stream.

FIG. 3 also shows an example of the entire text represented by the audio data 236. The text is shown generally at 238. Text 238 has a lighter portion (or unbracketed portion) that represents the entire text from the "failure" extraction window 206 in the higher level 186 of the hierarchical structure. The bracketed text represents the entire text from the podcast corresponding to the "catastrophic" extraction window 216 in the intermediate level 188. The sentence summary generated for level 190 is a summary, generated by text summarization system 150, of the bracketed text shown in the text portion 238. As discussed above, text summarization is only one example of how the text for level 190 is generated. It can be generated also using keyword extraction, using key sentence extraction, or in other ways.

Continuing with the example in which a scrollbar 182 is surfaced for user 104 to scroll through the audio stream (represented by audio data 192 in FIG. 3), if the user is scrolling the thumb 184 relatively quickly across scrollbar 182, the words extracted by the hierarchical topic modeling system 146 for the highest level 186 are displayed to the user, as the user scrolls along. For instance, when the user scrolls thumb 184 to a timestamp between 25:45 and 29:28 of the audio stream, the word "failure" will be displayed to the user. In one example, one or more words on either side of the word "failure" can be displayed as well.

If the user begins scrolling more slowly, then the keywords extracted for the second level 188 are displayed to the user. For instance, as the user scrolls slowly between the time 25:45 and 29:28 of the audio stream, then the words in level 188 will be displayed. If the user 104 scrolls even more slowly, then the words extracted by the hierarchical topic modeling system 146 for level 190 will be shown to the user. For instance, if the user begins scrolling even more slowly (or perhaps pauses) between the time 26:14 and 26:36 of the audio stream, then the sentence summarization shown for level 190 will be displayed to the user.

Figure 4:
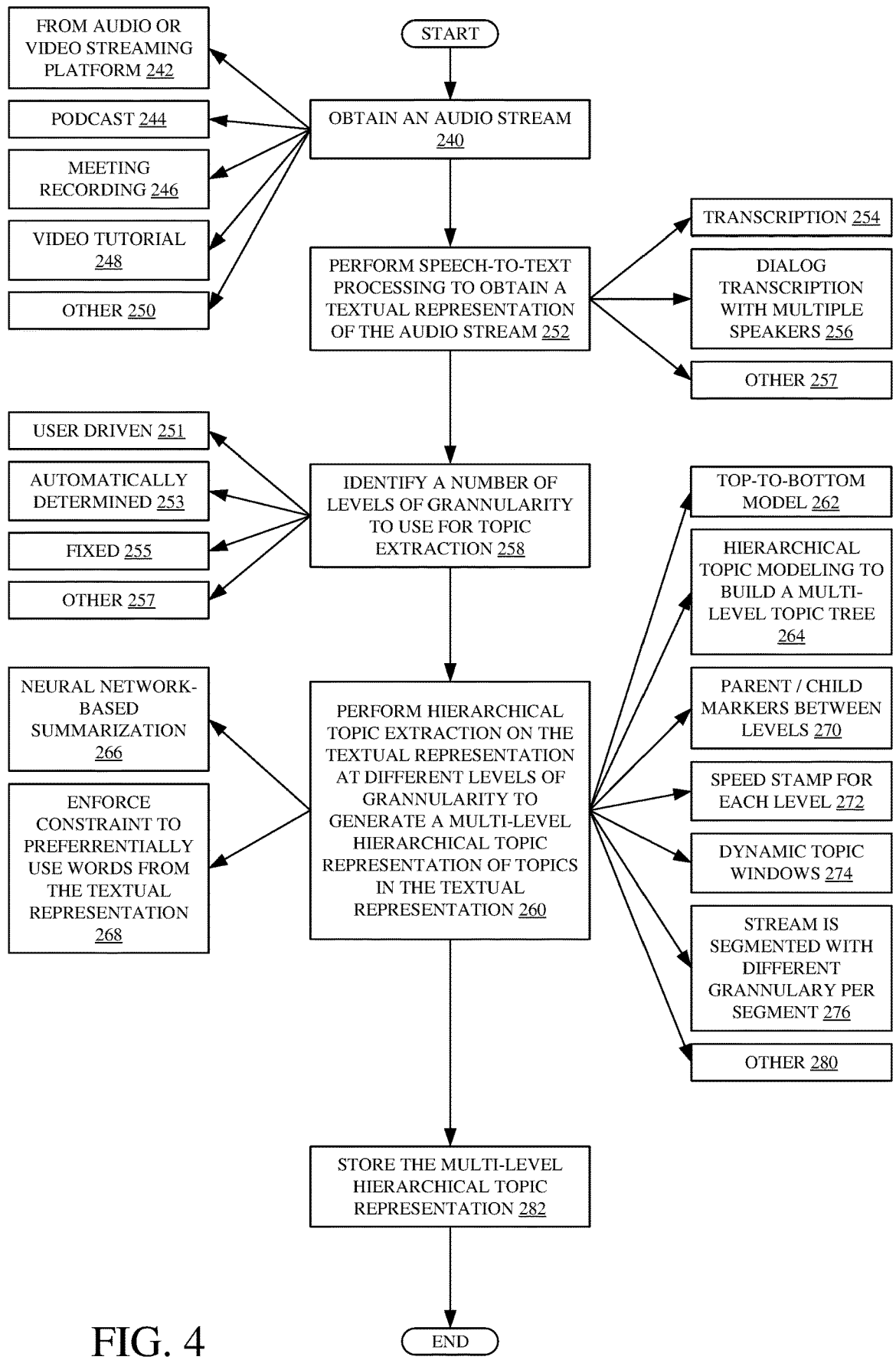
FIG. 4 is a flow diagram illustrating one example of the operation of the architecture illustrated in FIG. 1, in generating a textual representation of an audio stream, and a multi-level hierarchical topic representation of the textual representation.

FIG. 4 is a flow diagram illustrating one example of the operation of computing system 102 in obtaining an audio stream (e.g., audio stream data 130) and generating a multi-level hierarchical topic representation 132 corresponding to the audio stream data 130.

Speech-to-text processing system 116 first obtains an audio stream 130 for which a hierarchical topic representation is to be generated. Obtaining the audio stream 130 is indicated by block 240 in the flow diagram of FIG. 4. As discussed above, the audio stream may be from an audio or video streaming platform as indicated by block 242. It can be such things as a podcast 244, a meeting recording 246, a video tutorial that is heavily dependent on audio information 248, and it can be a wide variety of other audio streams 250.

Speech-to-text processing system 116 then performs speech-to-text processing on the audio stream in order to obtain a textual representation of the audio stream. This is indicated by block 252. The textual representation can be a transcription, generated by transcription system 138. This is indicated by block 254. It can also be a dialog transcription with multiple speakers, generated by multi-speaker dialog transcription system 140. Performing dialog transcription is represented by block 256 in the flow diagram of FIG. 4. The textual representation can take other forms, and be generated in other ways as well, and this is indicated by block 256.

The textual representation is provided to hierarchical topic extraction system 118 for the generation of a multi-level hierarchical topic representation. Number of levels detector 144 identifies the number of levels to be generated in the hierarchical structure. As discussed above, this can be based on user inputs, based on the length of the audio stream, etc. Also, it need not be determined ahead of time but can be determined dynamically, during processing. Identifying a number of levels of granularity to use for topic extraction is indicated by block 258 in the flow diagram of FIG. 4.

The hierarchical topic modeling system 146 either alone, or in combination with other systems (such as text summarization system 150), then performs hierarchical topic extraction on the textual representation, at different levels of granularity identified by the number of levels of granularity that were detected, to generate the multi-level hierarchical topic representation of the topics in the textual representation. Performing the hierarchical topic extraction is indicated by block 260 in the flow diagram of FIG. 4.

In one example, the topic extraction is performed using a top-to-bottom extraction model 262. This renders a multi-level hierarchical structure in which the more general topics are indicated at the top levels of the structure, and the more specific topics, with higher granularity, are indicated at the lower levels of the structure. Various different types of hierarchical topic modeling can be used to build the multi-level topic structure. This is indicated by block 264. In addition, neural network-based summarization or other text summarization systems 150 can be used to extract topic information as well, and this indicated by block 266. In generating the textual terms representing the topics, hierarchical topic extraction system 118 illustratively enforces a constraint to preferentially use words from the textual representation, itself. This is indicated by block 268. This enables the user to more quickly identify different places in the audio stream, because the same words that are used in the audio stream will appear in the topic representations.

In one example, the multi-level hierarchical topic representation is a tree structure in which parent nodes represent topic extraction with less granularity (or detail) while child nodes represent topic extraction of greater granularity. Thus, the tree structure includes markers which identify child nodes, for a parent node, and a parent node, for child nodes. Having parent/child markers to move between levels in the multi-level hierarchical structure is indicated by block 270 in the flow diagram of FIG. 4.

Speed stamp generator 148 also illustratively generates a speed stamp for each level. As indicated above, the speed stamp may be a range of speeds that identify scroll speeds for which the corresponding level of extracted topics will be displayed. Generating a speed stamp for each level is indicated by block 272. The topic extraction windows may be of a fixed time period, or they may be variable. For instance, the topic extraction windows 194-212 shown in FIG. 3 may all be of the same time duration, or they may be variable. The length of time corresponding to each topic extraction window may vary based upon the amount of text in each topic extraction window, the number of speakers in each topic extraction window, or based on other criteria. Having dynamic length topic extraction windows is indicated by block 274 in the flow diagram of FIG. 4.

The audio stream may also be segmented into different segments, and the number of levels of granularity in the hierarchical structure, for each segment, may be different. For instance, when the audio stream is a recorded meeting, the user may be present for the first portion of the recorded meeting, but be absent for the second portion. In that case, the user may segment the first portion of the audio stream in one segment, and the second portion of the audio stream in a second segment. The user may wish to have more fine granularity in the hierarchical structure for the second segment, over the first segment. This is just one example of how the audio stream may be segmented, with different levels of granularity per segment. This is indicated by block 276.

As discussed above, the number of levels can be user-driven, or automatically driven, or it can be fixed. This is indicated by block 278. The multi-level hierarchical topic representation can be generated in a wide variety of other ways as well. This is indicated by block 280.

Data store interaction system 152 then stores the multi-level hierarchical topic representation in data store 114. This is indicated by block 282. The structure may be stored along with the corresponding audio stream data 130, in an audio file 124, or it may be stored separately.

Figure 5:
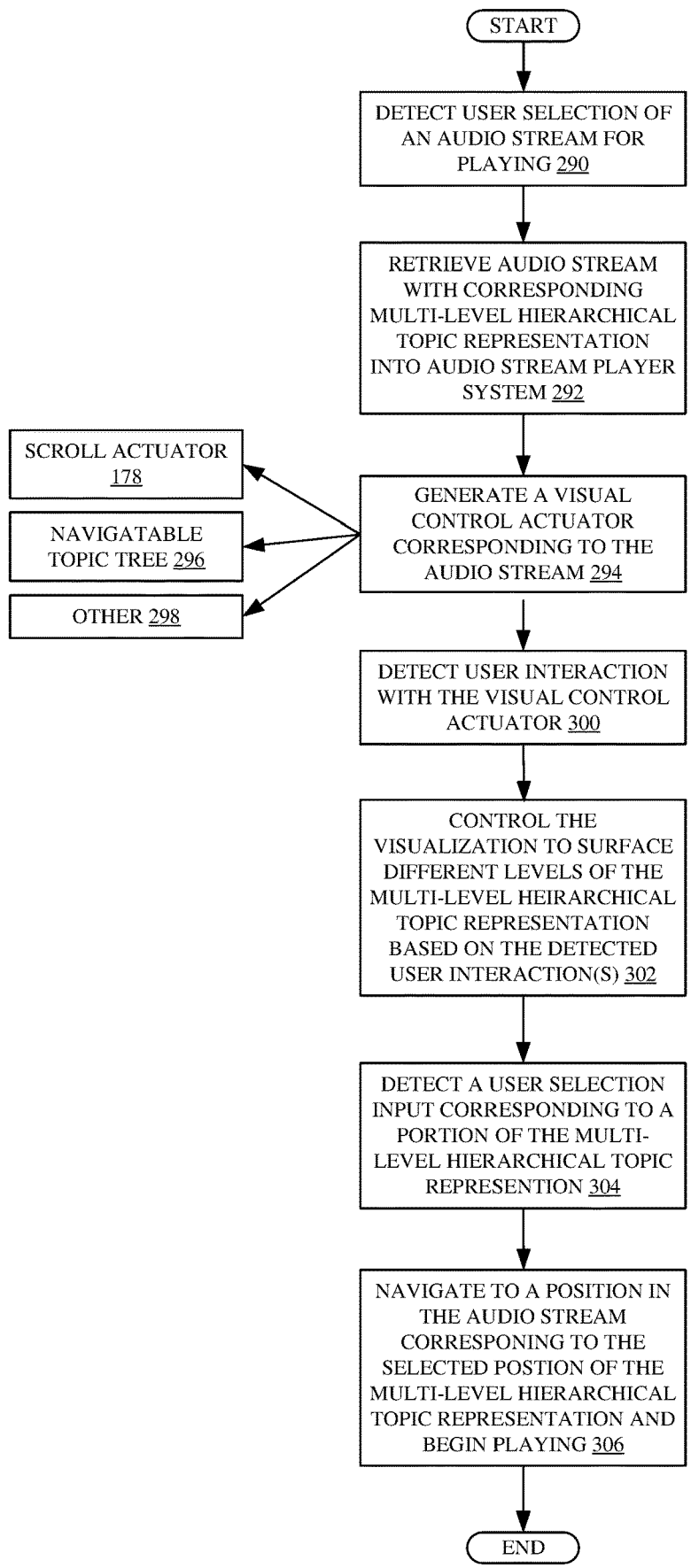
FIG. 5 is a flow diagram illustrating one example of the operation of the computing architecture shown in FIG. 1, in generating a visualization of the multi-level hierarchical topic representation, and varying the visual representation based upon a user actuation input.

FIG. 5 is a flow diagram illustrating one example of how audio stream player system 120 generates a visualization and allows user 106 to scroll through the audio stream while displaying extracted topics having different levels of granularity, based upon the way that user 104 is actuating the control actuator. Audio stream selection detector 156 first detects a user input (or a programmatic or other input) selecting one of the audio stream files 124-126 for playback. This is indicated by block 290 in the flow diagram of FIG. 5. Data store interaction system 158 then extracts the audio file (in this case audio file 124) for visualization and playback. Extracting the audio file and loading it into audio stream playing component 162, and extracting the multi-level hierarchical topic representation 132 is indicated by block 292 in the flow diagram of FIG. 5.

Visualization processing system 160 then generates a visualization of the multi-level hierarchical topic representation corresponding to the audio stream 130. For instance, audio control actuator generation/interaction component 166 generates an actuator (such as actuator 178 shown in FIG. 2) that allows user 104 to interact with the audio stream. This is indicated by block 294. In another example, component 166 displays a navigatable multi-tier hierarchical topic representation (such as multi-level tree) that can be navigated by user 104. This is indicated by block 296. The actuator can be displayed in other ways as well, and this is indicated by block 298.

Component 166 then detects user interaction with the audio stream control actuator. This is indicated by block 300. For instance, the user may scroll through the audio stream, select a node or level in the hierarchical tree, or actuate the actuator in other ways.

Visualization processing system 160 then controls the visualization to surface a different level of the multi-level hierarchical topic representation based upon the detected user interactions. This is indicated by block 302. For instance, if the user is scrolling a scroll actuator, then actuation speed detector 168 identifies the scrolling speed. Hierarchical level identification system 170 identifies a level of the multi-level hierarchical structure to display to the user. As the user is scrolling the scroll bar, scroll position detector 169 detects the position of the scroll bar, and level surfacing system 172 surfaces the information from the identified level and from the corresponding position in the audio stream, for the user, as the user is scrolling.

At some point, the user will provide a user selection input, selecting a point in the audio stream that corresponds to a portion of the multi-level hierarchical topic representation. This may be by the user actuating a start/stop actuator 180, which is detected by start playing input detector 174. It may be by the user tapping on the scrollbar, once a desired position in the audio stream is reached, or in other ways. Detecting the user selection input is indicated by block 304 in the flow diagram of FIG. 5.

Audio stream playing component 162 then navigates to the position in the audio stream corresponding to the portion of the multi-level hierarchical topic representation that was selected by the user 104. Audio stream playing component 162 then begins playing the audio stream, at that point in the audio stream. Navigating to the selected point in the audio stream and beginning to play the audio stream at that point, is indicated by block 306 in the flow diagram of FIG. 5.

Figure 6:
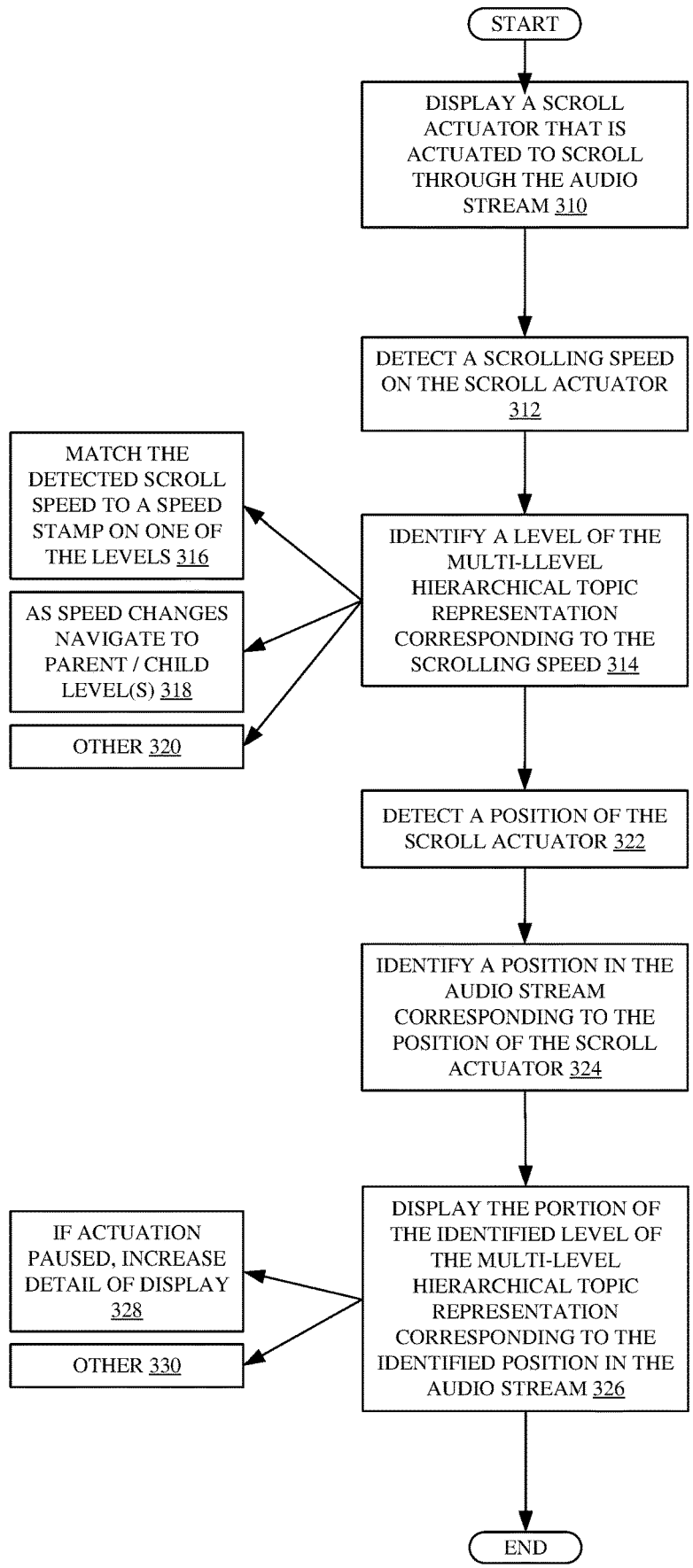
FIG. 6 is a flow diagram illustrating one example of the operation of a visualization processing system in generating a visualization of the multi-level hierarchical representation, and in responding to detected user inputs.

FIG. 6 is a flow diagram illustrating one example of the operation of audio stream player system 120 in a specific example in which the audio stream control actuator includes a scrollbar, such as scrollbar 182 shown in FIG. 2. FIG. 6 thus shows one example of the operation performed at block 302 in FIG. 5, in more detail.

Audio control actuator generation/interaction component 166 first displays a scroll actuator that is actuated to scroll through the audio stream 130. This is indicated by block 310 in the flow diagram of FIG. 6. One example of a scrollbar is shown as scrollbar 182 in FIG. 2.

Actuation speed detector 168 then detects a scrolling speed indicative if a speed at which user 104 is scrolling the thumb 184 across scrollbar 182. Detecting the scrolling speed is indicated by block 312 in the flow diagram of FIG. 6.

Hierarchical level identification system 170 then identifies a level of the multi-level hierarchical topic representation corresponding to the scrolling speed. This is indicated by block 314. For instance, system 170 can match the scrolling speed against the speed stamps on the different levels of the hierarchical structure in order to identify a level where the scroll speed matches the speed stamp. This is indicated by block 316. Also, as the scroll speed changes, hierarchical level identification system 170 may identify a different level where the scroll speed matches the speed stamp. This may include navigating to parent nodes, or child nodes in the hierarchical structure. This is indicated by block 318 in the flow diagram of FIG. 6. Identifying the level of the multi-level hierarchical topic representation corresponding to the scrolling speed can be done in a wide variety of other ways as well, and this is indicated by block 320.

Scroll position detector 169 identifies a position of the scroll actuator (e.g., thumb 184) on scrollbar 182. This is indicated by block 322. Component 186 then identifies a position, in the audio stream 130, corresponding to the position of the actuator (thumb 184) on scrollbar 182. This is indicated by block 324.

Identified level surfacing system 172 then displays the portion of the identified level of the multi-level hierarchical topic representation corresponding to the identified position in the audio stream. This can be displayed as the extracted topic display 183 discussed above with respect to FIG. 2. Displaying the topic representation from the identified level in the multi-level hierarchical structure is indicated by block 326 in the flow diagram of FIG. 6.

The extracted topic display 183 can take various forms as well. For instance, as the user is scrolling from left to right (or right to left) topic words on either side of the currently displayed topic word can be displayed as well, so that the user can see the topics that are coming up as the user scrolls, and the topics that were recently passed. Similarly, if the user pauses the thumb 184 at a particular position, then identified level surfacing system 172 may display a more detailed topic representation (display information from a lower level on the multi-level hierarchical topic representation) as the extracted topic display 183. Displaying more detailed information when the user pauses the scroll actuator is indicated by block 328. The identified level of the multi-level hierarchical topic representation can be displayed in other ways as well, and this is indicated by block 330.

It can thus be seen that the present description uses hierarchical topic extraction on a textual representation of an audio stream in order to render a user interface that makes it relatively easy for user 106 to scroll and/or seek through the audio stream. The speed of scrolling indicates the level of abstraction that is presented to the user, from the multi-level hierarchical structure. For instance, when the user scrolls faster, the user sees high level topics, and as the user scrolls more slowly, the user sees more granular topic levels. At the slowest speed, in one example, the user sees the full sentence of the audio stream. In another example, instead of using a scrolling actuator, the user can visually navigate through a topic/sentence tree that represents the multi-level hierarchical structure, to navigate to a particular timestamp of the audio stream.

It will also be noted that the present description can also be applied to a textual document. For example, instead of generating a textual representation of an audio stream, the topic extraction, scroll actuator and user experience can also be applied to a textual document, such as a news article, e-book, etc. This allows a user to quickly scroll to a desired point in the textual document in substantially the same way as scrolling to a desired point in an audio stream.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
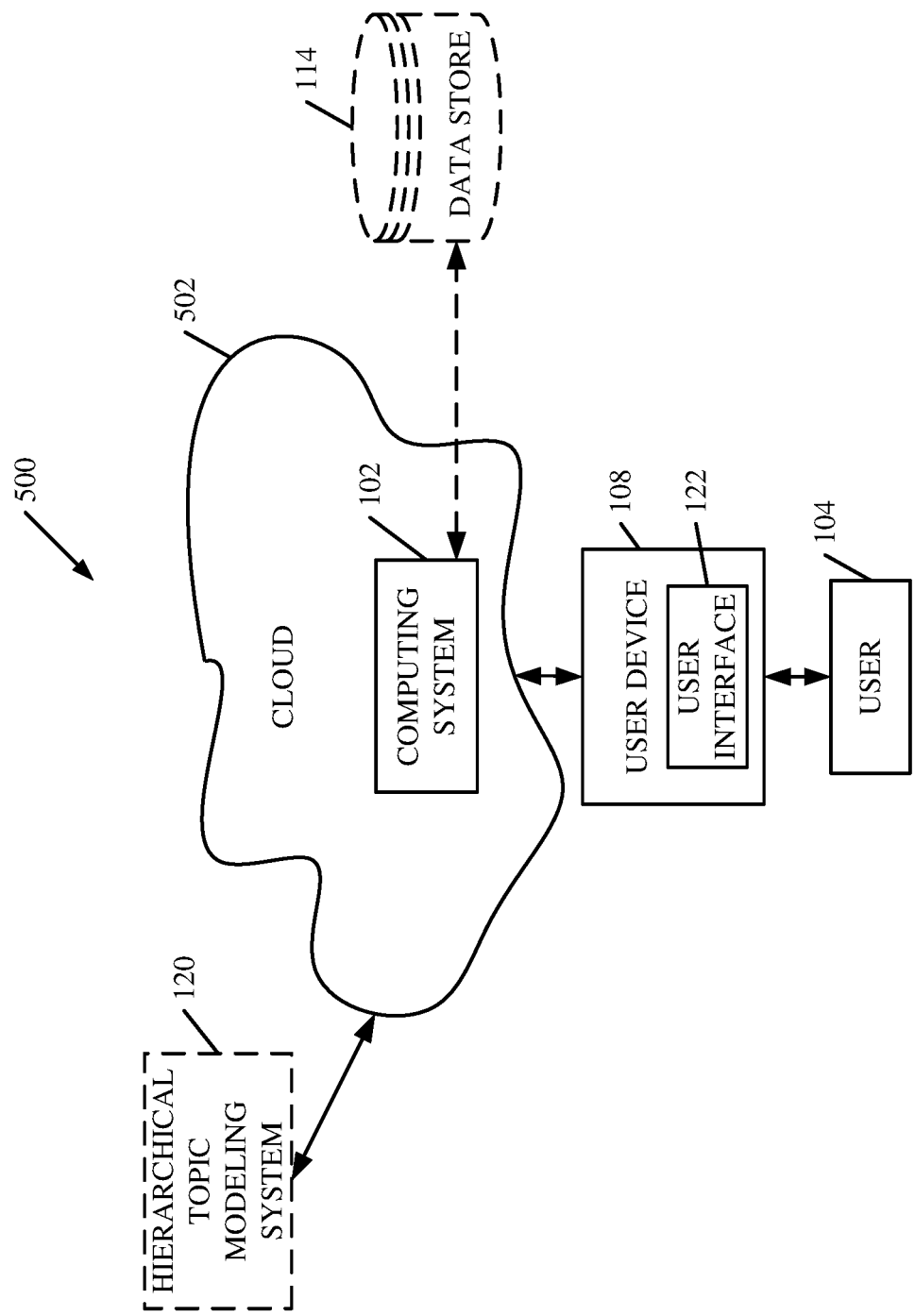
FIG. 7 is a block diagram of one example of the computing system architecture, shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that calendar computing system 102 can be located in cloud 502 (which can be public, private, or a combination where portions are public while others are private). Therefore, user 108 uses a user device 504 to access those systems through cloud 502.

FIG. 7 also depicts another example of a cloud architecture. FIG. 7 shows that it is also contemplated that some elements of computing system 102 can be disposed in cloud 502 while others are not. By way of example, data store 112 can be disposed outside of cloud 502, and accessed through cloud 502. In another example, indexing logic 114 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
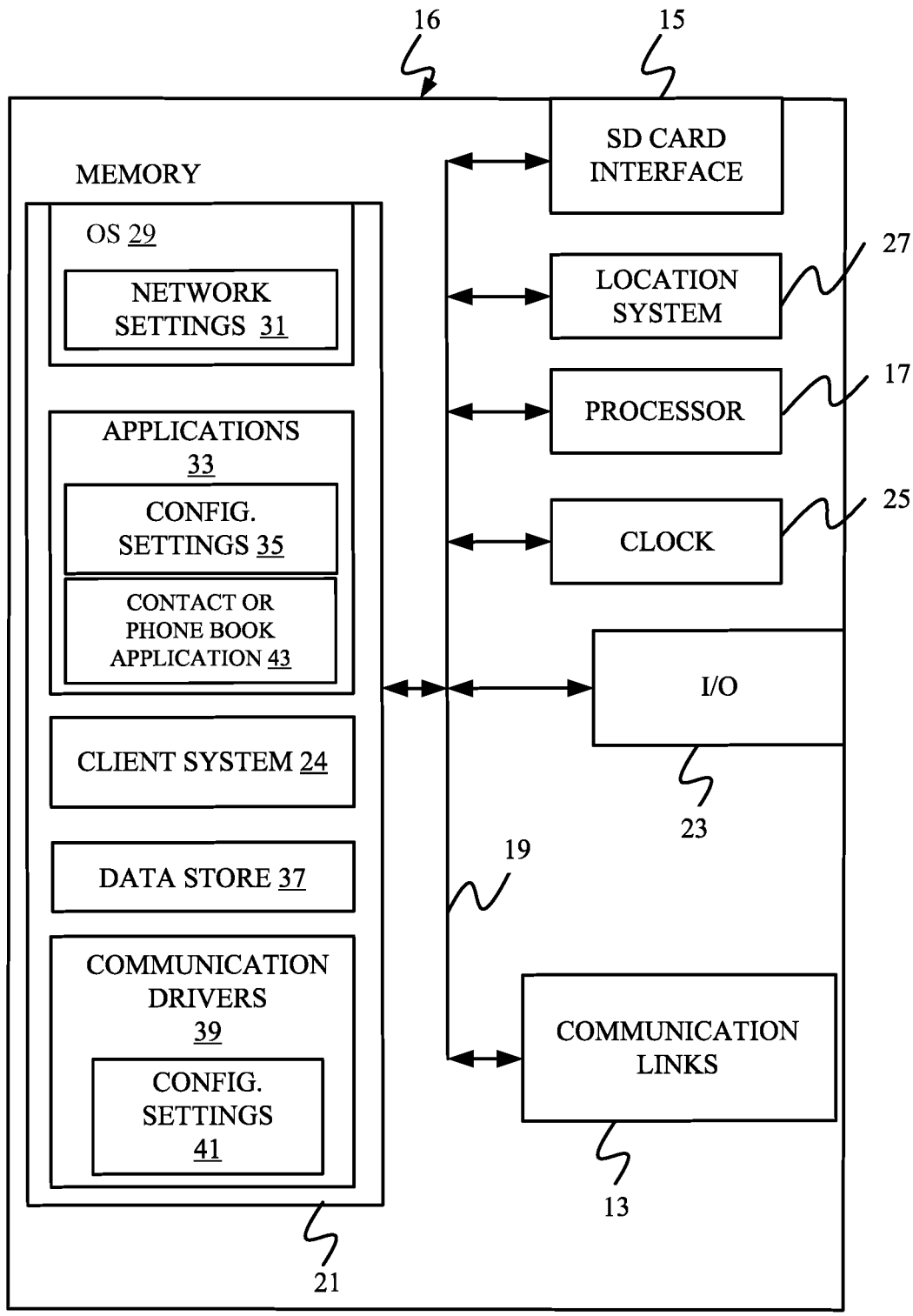
FIGS. 8-10 show examples of mobile devices that can be used in the architectures shown in the previous figures.
Figure 9:
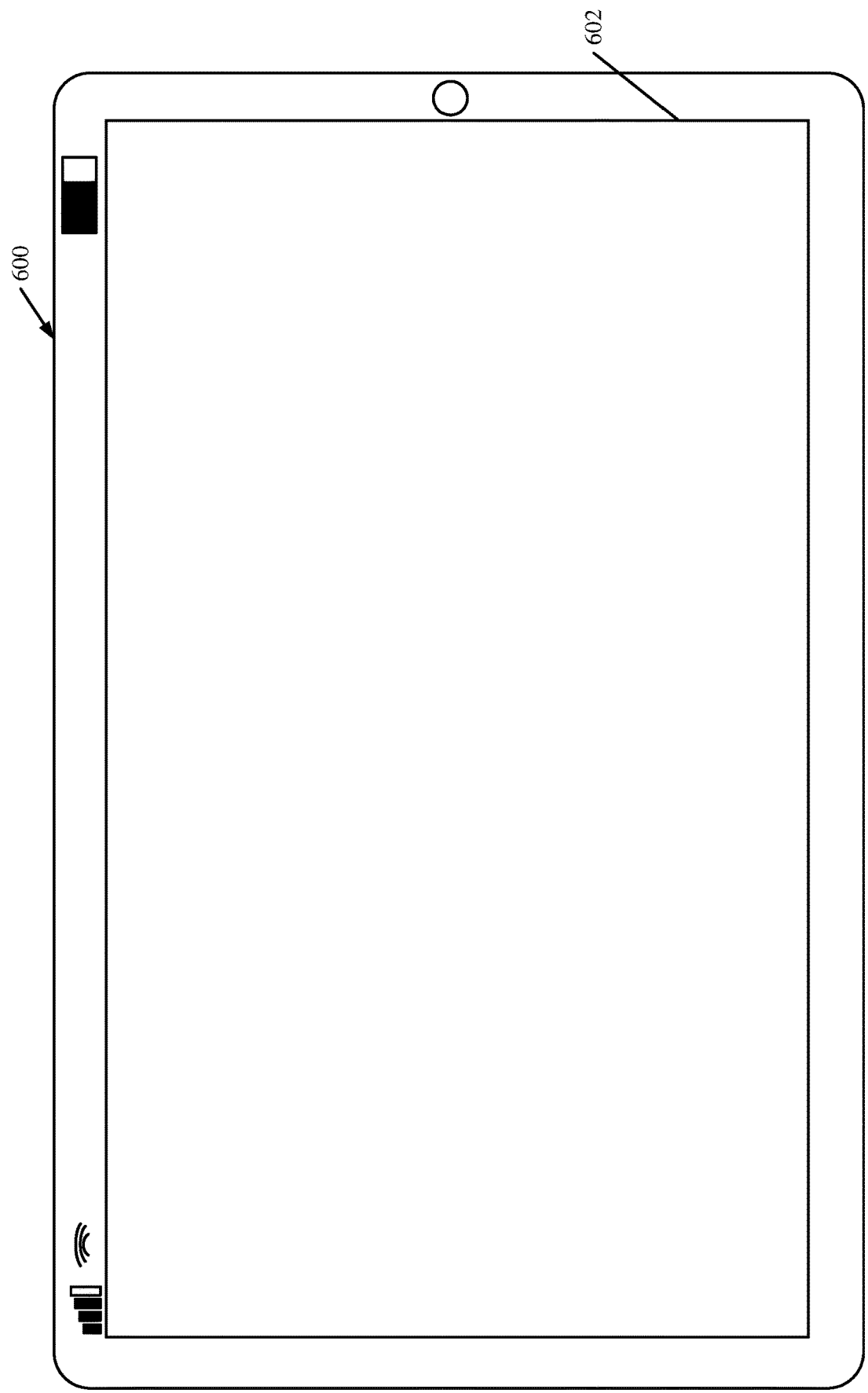
Figure 10:
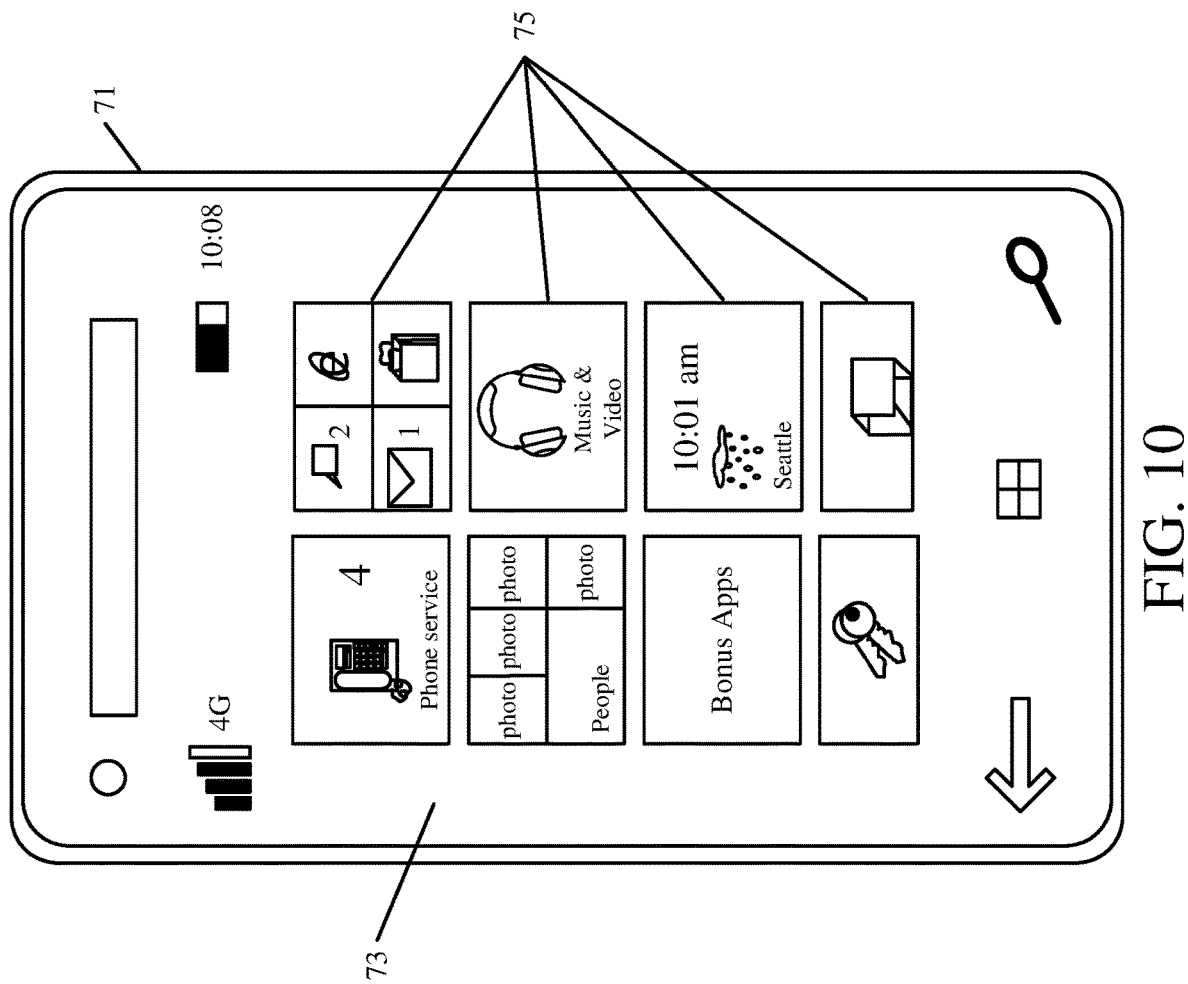

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components computing system 102 or user device 108 or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
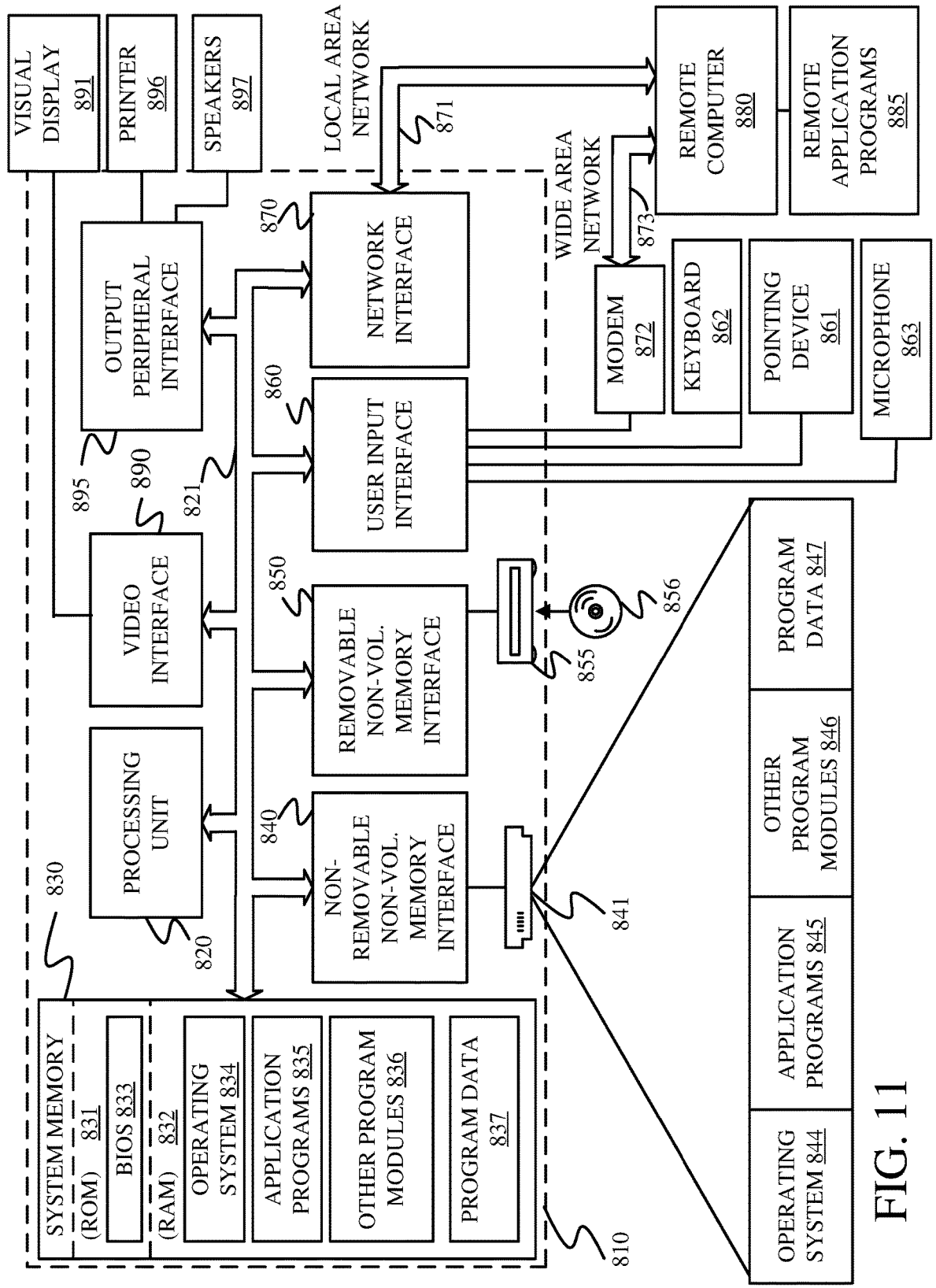
FIG. 11 is a block diagram showing one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:

generating a representation of a display of a seek/scroll actuator corresponding to an audio stream;

detecting an operator input on the seek/scroll actuator;

detecting an actuator speed at which the operator is moving through the audio stream based on the operator input on the seek/scroll actuator;

identifying a position in the audio stream based on a position of the operator input on the seek/scroll actuator; and generating a representation of a display of textual topic display elements, extracted from the audio stream at the identified position in the audio stream, along with the seek/scroll actuator, the textual topic display elements being indicative of more general topics extracted from the identified position in the audio stream when the scroll speed is at a first speed and the textual topic display elements being indicative of more detailed topics extracted from the identified position in the audio stream when the scroll speed is at a second speed, slower than the first speed.

Example 2 is the computer implemented method of any or all previous examples wherein generating a representation of a display of textual topic display elements comprises:

generating a multi-level hierarchical topic representation of a textual representation of the audio stream; and identifying the textual topic display element, in the multi-level hierarchical topic representation, based on the detected actuator speed and the identified position in the audio stream.

Example 3 is the computer implemented method of any or all previous examples, and further comprising:

obtaining the audio stream; and performing speech-to-text processing on the audio stream to generate the textual representation of the audio stream.

Example 4 is the computer implemented method of any or all previous examples wherein generating the multi-level hierarchical topic representation comprises:

for each level in the multi-level hierarchical topic representation, dividing the audio stream into different extraction windows, each extraction window corresponding to a different window of time in the audio stream; and for each extraction window, generating a set of textual topic display elements indicative of topics extracted from the corresponding extraction window.

Example 5 is the computer implemented method of any or all previous examples wherein generating a set of textual topic display elements for each extraction window comprises:

generating more general topic display elements for each window, on a first level of the multi-level hierarchical topic display representation; and generating more detailed topic display elements for each window, on a second level of the multi-level hierarchical topic display representation.

Example 6 is the computer implemented method of any or all previous examples wherein generating the multi-level hierarchical topic representation comprises:

assigning a speed stamp to each level in the multi-level hierarchical topic representation Example 7 is the computer implemented method of any or all previous examples wherein identifying the textual topic display element, in the multi-level hierarchical topic representation, based on the detected actuator speed and the identified position in the audio stream comprises:

identifying which speed stamp most closely corresponds to the detected actuator speed; and identifying the textual topic display element from the level in the multi-level hierarchical topic display representation that has the identified speed stamp that most closely corresponds to the detected actuator speed.

Example 8 is the computer implemented method of any or all previous examples wherein generating a set of textual topic display elements indicative of topics extracted from the corresponding extraction window comprises:

extracting, as the set of textual topic display elements, words used in the extraction window of the audio stream.

Example 9 is the computer implemented method of any or all previous examples wherein generating a set of textual topic display elements indicative of topics extracted from the corresponding extraction window comprises:

obtaining, as the set of textual topic display elements, a summary of words used in the extraction window of the audio stream.

Example 10 is the computer implemented method of any or all previous examples wherein generating a set of textual topic display elements indicative of topics extracted from the corresponding extraction window comprises:

for extraction windows on a lowest level of the multi-level hierarchical topic representation, extracting a representative text fragment of a portion of the audio stream in the extraction window as the set of textual topic display elements.

Example 11 is a computing system, comprising:

an audio control actuator generation component generating a representation of a display of a seek/scroll actuator corresponding to an audio stream and detecting an operator input on the seek/scroll actuator;

an actuation speed detector detecting an actuator speed at which the operator is moving through the audio stream based on the operator input on the seek/scroll actuator;

a seek/scroll position detector identifying a position in the audio stream based on a position of the operator input on the seek/scroll actuator; and a visualization processing system generating a representation of a display of textual topic display elements, extracted from the audio stream at the identified position in the audio stream, along with the seek/scroll actuator, the textual topic display elements being indicative of more general topics extracted from the identified position in the audio stream when the scroll speed is at a first speed and the textual topic display elements being indicative of more detailed topics extracted from the identified position in the audio stream when the scroll speed is at a second speed, slower than the first speed.

Example 12 is the computing system of any or all previous examples and further comprising:

a hierarchical topic extraction system generating a multi-level hierarchical topic representation of a textual representation of the audio stream, wherein the visualization processing system identifies the textual topic display element, in the multi-level hierarchical topic representation, based on the detected actuator speed and the identified position in the audio stream.

Example 13 is the computing system of any or all previous examples, and further comprising:

a speech-to-text processing system that obtains the audio stream and performs speech-to-text processing on the audio stream to generate the textual representation of the audio stream.

Example 14 is the computing system of any or all previous examples wherein the hierarchical topic extraction system comprises:

a hierarchical topic modeling system that, for each level in the multi-level hierarchical topic representation, divides the audio stream into different extraction windows, each extraction window corresponding to a different window of time in the audio stream, and, for each extraction window, generates a set of textual topic display elements indicative of topics extracted from the corresponding extraction window.

Example 15 is the computing system of any or all previous examples wherein the hierarchical topic modeling system is configured to generate more general topic display elements for each window, on a first level of the multi-level hierarchical topic display representation, and generate more detailed topic display elements for each window, on a second level of the multi-level hierarchical topic display representation.

Example 16 is the computing system of any or all previous examples wherein the multi-level hierarchical topic extraction system comprises:

a speed stamp generator that assigns a speed stamp to each level in the multi-level hierarchical topic representation.

Example 17 is the computing system of any or all previous examples wherein the visualization processing system comprises:

a hierarchical level identification system identifying which speed stamp most closely corresponds to the detected actuator speed, and identifies the textual topic display element from the level in the multi-level hierarchical topic display representation that has the identified speed stamp that most closely corresponds to the detected actuator speed.

Example 18 is the computing system of any or all previous examples wherein the hierarchical topic modeling system generates the set of textual topic display elements indicative of topics extracted from the corresponding extraction window by extracting, as the set of textual topic display elements, words used in the extraction window of the audio stream.

Example 19 is the computing system of any or all previous examples wherein the hierarchical topic modeling system comprises:

a text summarization system that obtains, as the set of textual topic display elements, a summary of words used in the extraction window of the audio stream.

Example 20 is a computer implemented, comprising:

generating a multi-level hierarchical topic representation of a textual document;

generating a representation of a positioning actuator display element that is actuated to navigate to a corresponding position in the textual document;

detecting a speed of operator actuation of the positioning actuator display element;

identifying a textual topic element, in the multi-level hierarchical topic representation, based on the speed of operator actuation of the positioning actuator display element and the corresponding position in the textual document; and generating a display of the identified textual topic element from the multi-level hierarchical topic representation along with the positioning actuator display element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    generating a multi-level hierarchical topic representation of an audio stream, the multi-level hierarchical topic representation comprising textual topic elements, each textual topic element extracted from a corresponding position in the audio stream, wherein
        a first level of the multi-level hierarchical topic representation includes more general textual topic elements, and
        a second level of the multi-level hierarchical topic representation includes more detailed textual topic elements;
    assigning a speed stamp to each level in the multi-level hierarchical topic representation;
    generating a representation of a display of a seek/scroll actuator corresponding to the audio stream;
    detecting an operator input on the seek/scroll actuator;
    detecting an actuator speed at which the operator is moving through the audio stream based on the operator input on the seek/scroll actuator;
    identifying a position in the audio stream based on a position of the operator input on the seek/scroll actuator;
    identifying which speed stamp most closely corresponds to the detected actuator speed; and
    selecting a level in the multi-level hierarchical topic representation that has the identified speed stamp that most closely corresponds to the detected actuator speed;
    identifying, from the selected level, a particular textual topic element extracted from the identified position in the audio stream; and
    generating a representation of a display of the particular textual topic element along with the seek/scroll actuator.

2. The computer implemented method of claim 1, and further comprising:
    obtaining the audio stream; and
    performing speech-to-text processing on the audio stream to generate the textual representation of the audio stream.

3. The computer implemented method of claim 1, wherein generating the multi-level hierarchical topic representation comprises:
    for each level in the multi-level hierarchical topic representation, dividing the audio stream into different extraction windows, each extraction window corresponding to a different window of time in the audio stream; and
    for each extraction window, generating a set of textual topic display elements indicative of topics extracted from the corresponding extraction window.

4. The computer implemented method of claim 3 wherein generating a set of textual topic display elements for each extraction window comprises:
    generating more general topic display elements for each window, on the first level of the multi-level hierarchical topic representation; and
    generating more detailed topic display elements for each window, on the second level of the multi-level hierarchical topic representation.

5. The computer implemented method of claim 1, wherein the display of the particular textual topic element comprises an extracted topic display that is adjacent the seek/scroll actuator.

6. The computer implemented method of claim 1, wherein the multi-level hierarchical topic representation comprises:
    a first level topic representation indicative of a first level of topic detail extracted from the identified position in the audio stream, and
    a second level topic representation indicative of a second level of topic detail extracted from the identified position in the audio stream, the second level of topic detail being more detailed than the first level of topic detail; and identifying the particular textual topic element comprises selecting a topic representation from the first or second level topic representations based on the scroll speed.

7. The computer implemented method of claim 3 wherein generating a set of textual topic display elements indicative of topics extracted from the corresponding extraction window comprises at least one of:
   extracting, as the set of textual topic display elements, words used in the extraction window of the audio stream,
   obtaining, as the set of textual topic display elements, a summary of words used in the extraction window of the audio stream, or
   for extraction windows on a lowest level of the multi-level hierarchical topic representation, extracting a representative text fragment of a portion of the audio stream in the extraction window as the set of textual topic display elements.

8. A computing system, comprising:
   at least one processor; and
   memory storing instructions executable by the at least one processor, wherein the instructions, when executed, cause the computing system to:
      generate a multi-level hierarchical topic representation of an audio stream, the multi-level hierarchical topic representation comprising textual topic elements, each textual topic element extracted from a corresponding position in the audio stream, wherein
         a first level of the multi-level hierarchical topic representation includes more general topic elements, and
         a second level of the multi-level hierarchical topic representation includes more detailed topic elements;
      assign a speed stamp to each level in the multi-level hierarchical topic representation;
      generate a representation of a display of a seek/scroll actuator corresponding to the audio stream;
      detect an operator input on the seek/scroll actuator;
      detect an actuator speed at which the operator is moving through the audio stream based on the operator input on the seek/scroll actuator;
      identify a position in the audio stream based on a position of the operator input on the seek/scroll actuator;
      identify which speed stamp most closely corresponds to the detected actuator speed; and
      select a level in the multi-level hierarchical topic representation that has the identified speed stamp that most closely corresponds to the detected actuator speed;
      identify, from the selected level, a particular textual topic element extracted from the identified position in the audio stream; and
      generate a representation of a display of the particular textual topic element along with the seek/scroll actuator.

9. The computing system of claim 8, wherein the instructions cause the computing system to:
   perform speech-to-text processing on the audio stream; and
   generate the textual representation of the audio stream based on the speech-to-text processing.

10. The computing system of claim 8, wherein the instructions cause the computing system to:
    for each level in the multi-level hierarchical topic representation, divide the audio stream into different extraction windows, each extraction window corresponding to a different window of time in the audio stream, and
    for each extraction window, generate a set of textual topic display elements indicative of topics extracted from the corresponding extraction window.

11. The computing system of claim 10, wherein the instructions cause the computing system to:
    generate more general topic display elements for each window, on the first level of the multi-level hierarchical topic display representation, and
    generate more detailed topic display elements for each window, on the second level of the multi-level hierarchical topic display representation.

12. The computing system of claim 8, wherein the display of the particular textual topic element comprises an extracted topic display that is adjacent the seek/scroll actuator.

13. The computing system of claim 8, wherein the instructions cause the computing system to:
    extract, as a set of textual topic elements in the second level, words used in the extraction window of the audio stream.

14. The computing system of claim 8, wherein the instructions cause the computing system to:
    obtain, as a set of textual topic elements in the first level, a summary of words used in the extraction window of the audio stream.

15. A computer implemented method, comprising:
    generating a multi-level hierarchical topic representation of a textual document, the multi-level hierarchical topic representation comprising:
       a first textual topic element indicative of a first level of topic detail extracted from a particular position in the textual document, and
       a second textual topic element indicative of a second level of topic detail extracted from the particular position in the textual document, the second level of topic detail being more detailed than the first level of topic detail;
    assigning a speed stamp to each level in the multi-level hierarchical topic representation;
    generating a representation of a positioning actuator display element that is actuated to navigate to the particular position in the textual document;
    detecting a speed of operator actuation of the positioning actuator display element;
    identifying which speed stamp most closely corresponds to the detected speed of operator actuation of the positioning actuator display element;
    selecting a textual topic element, from the first and second textual topic elements in the multi-level hierarchical topic representation, that has the identified speed stamp that most closely corresponds to the detected speed of operator actuation of the positioning actuator display element; and
    generating a display of the selected textual topic element from the multi-level hierarchical topic representation along with the positioning actuator display element.

* * * * *